May 18, 1965     F. FRANKLIN ETAL     3,184,739

METHOD OF TRACKING RADAR TARGETS IN PRESENCE OF JAMMING

Filed Oct. 14, 1960

INVENTOR.
PAUL KARL GILOTH
BY FREDERICK FRANKLIN

ATTORNEY 3,184,739
METHOD OF TRACKING RADAR TARGETS IN PRESENCE OF JAMMING
Frederick Franklin, Morristown, and Paul K. Giloth, Whippany, N.J., assignors, by mesne assignments, to the United States of America as represented by the Secretary of the Navy
Filed Oct. 14, 1960, Ser. No. 62,814
2 Claims. (Cl. 343—15)

The present invention relates to a novel and improved radar target detection system and more particularly to a novel and improved method of detecting and tracking a plurality of targets in the presence of jamming.

Conventional radar search and tracking techniques are usually adequate for tracking aircraft and/or other targets in the absence of enemy countermeasures. Where, however, the aircraft being tracked is equipped with a random noise jammer, a single search radar device cannot adequately track the target. The search radar can at best only provide a bearing indication when jamming is present. Such bearing data is obtained in the form of a bright line on the indicating scope only when the video gain of the search is sufficiently reduced. And when this is done, targets not using jamming do not appear at all on the radar indicator. Conventional methods of triangulation, which require only bearing data from three or more separated remote radar ground stations, have been used in the past. However, considerable difficulty is encountered where a plurality of targets are involved and a plurality of the same apply individual jamming signals.

It is therefore a principal object of the present invention to provide a novel and improved method of searching out and tracking a target in a given area in the presence of a strong jamming signal.

It is a further object of the present invention to provide a novel and improved method of searching out and tracking a plurality of targets in a defined area in the presence of a plurality of strong jamming signals.

Figure 1:
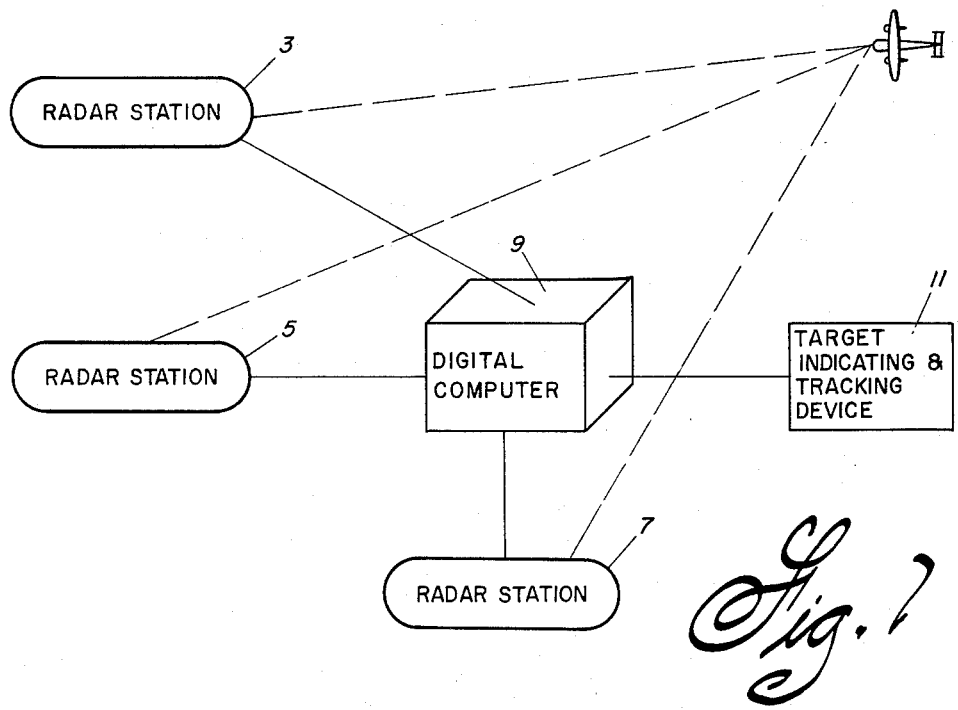
Figure 2:
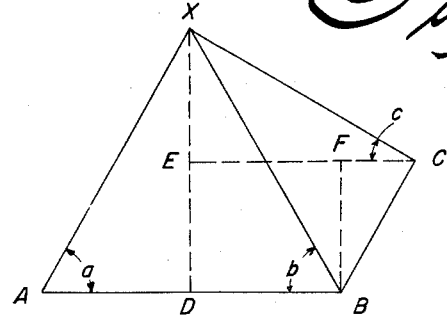

Other objects and many of the attendant advantages of this invention will be readily appreciated as the same becomes better understood by reference to the following detailed description when considered in connection with the accompanying drawings wherein:

FIG. 1 is a diagrammatic view of typical apparatus that might be used in carrying out the improved searching and tracking method of the present invention; and FIG. 2 is a geometric view of the target which is to be tracked and the radar ground stations from which suitable equations are determined for in a digital computer.

Apparatus which is used in the improved target detecting and tracking system of the present invention is illustrated diagrammatically in FIG. 1 of the drawing. As shown therein, the output circuits of the three separated remote ground radar stations 3, 5 and 7 are each coupled to the input circuit of the general purpose digital computer 9. The output circuit of the computer 9 is in turn connected to the target indicating and tracking device 11. Inasmuch as the structural details of the search radar equipment located at the stations 3, 5 and 7, the digital computer 9, and the indicating and tracking device 11 are of conventional design and form no part of the present invention, a full description of the same are omitted for the sake of simplicity. For a complete understanding of the invention it need only be understood that each of the radar search devices at stations 3, 5 and 7 continuously provide bearing data of all targets within a defined area, that the digital computer 9 compares all combinations of bearings from the three radar stations and solves for a common intersection of the same in space, and that the indicating and tracking device 11 accepts successive intersection determinations and continuously tracks and records the position and velocity of all jamming aircraft in the area.

Referring to the geometric diagram in FIG. 2 of the drawing, it will be seen that the following equations can be set up to define a specific point X in space from bearing measurements at three known radar station locations A, B and C.

With the distances AB, BC, BF, DE and CF and the bearings on X, AX, BX and CX known:

$$\tan a = \frac{XD}{AD} \quad (1)$$

and $$\tan b = \frac{XD}{BD} \quad (2)$$

Solving Equations 1 and 2 for XD and equating:

$$AD \tan a = BD \tan b \quad (3)$$

Substituting $AD = AB - BD$:

$$(AB - BD) \tan a = BD \tan b \quad (4)$$

And:

$$AB \tan a - BD \tan a = BD \tan b \quad (5)$$

Transposing and solving for BD:

$$BD = \frac{AB \tan a}{\tan a + \tan b} \quad (6)$$

Combining Equations 2 and 6:

$$XD = \frac{AB \tan a \tan b}{\tan a + \tan b} \quad (7)$$

$$\tan c = \frac{XE}{BD + CF} \quad (8)$$

And combining Equations 6 and 8 and solving for XE:

$$XE = \frac{AB \tan a \tan c}{\tan a + \tan b} + CF \tan c \quad (9)$$

Where $XE = XD - DE$, the three bearings $a$, $b$ and $c$ define a target at point X and the equation can be conventionally rearranged and programmed on a digital computer as suggested hereinbefore to select those bearings which define unique points. The data is then used with subsequent computations on new sets of bearings to establish the desired target tracks and target velocities.

With the above decribed apparatus and technique, it is seen that by using conventional radar devices in combination with a digital computer, multiple targets can be simultaneously tracked despite the presence of strong jamming signals.

Obviously many modifications and variations of the present invention are possible in the light of the above teachings. It is therefore to be understood that within the scope of the appended claims the invention may be practiced otherwise than as specifically described.

What is claimed is:

1. A method of tracking the position of a plurality of targets in the presence of jamming, said method comprising the steps of:
    (a) simultaneously determining the bearings of each of the targets from three different points;
    (b) computing the points of intersection of said bearings to determine the unique target positions;
    (c) and utilizing this positional information to track each target.

2. A method of tracking the position of a plurality of targets in the presence of jamming, said method comprising the steps of:
    (a) positioning three radar search devices at individually determined remote points;
    (b) reducing the gain of each radar device so that only unambiguous bearing information is presented;
    (c) simultaneously determining the bearings of each of the targets from each radar device;
    (d) computing the points of intersection of said bearings to determine the unique target positions;
    (e) and utilizing this positional information to track each target.

References Cited by the Examiner

UNITED STATES PATENTS

| | | | |
|---|---|---|---|
| 2,255,659 | 9/41 | Gage | 343—112 |
| 2,515,332 | 7/50 | Budenbom | 343—15 |
| 2,962,714 | 11/60 | Meixell | 343—114.5 |

FOREIGN PATENTS 721,197  1/60  Great Britain.

CHESTER L. JUSTUS, *Primary Examiner.*

KATHLEEN CLAFFY, *Examiner.*